Aug. 26, 1969     H. W. ROCKWELL     3,463,058

PISTON AND CYLINDER SEALING ARRANGEMENT

Filed Sept. 27, 1967

Inventor
Harvey W. Rockwell
By Charles L. Schmidt
Attorneys

United States Patent Office 3,463,058
Patented Aug. 26, 1969

3,463,058
PISTON AND CYLINDER SEALING
ARRANGEMENT
Harvey W. Rockwell, Springfield, Ill., assignor to Allis-
Chalmers Manufacturing Company, Milwaukee, Wis.
Filed Sept. 27, 1967, Ser. No. 670,960
Int. Cl. F16j 9/12
U.S. Cl. 92—250                                    3 Claims

ABSTRACT OF THE DISCLOSURE

An annular recess is provided on one of the pair of relatively extensible and contractable members into which a pair of axially spaced guide rings are installed providing an axial gap between their end faces. Within the radially outer part of this gap a flexible ring of Teflon material or the like is provided and a metallic spacer ring is installed in the radially inner part of the gap. An O-ring is positioned radially between the metallic ring and the sealing ring. The metallic spacer ring effectively serves to maintain the axial spacing between the two guide rings and provides a smooth surface at its outer diameter for the O-ring to slide on. The sealing ring is of slightly less axial width than the axial gap between the two guide rings. This is achieved by the spacer ring having a greater axial dimension than the sealing ring.

---

This invention relates to an improved sealing arrangement for relatively extensible and contractable members such as hydraulic actuators.

It is an object of the present invention to provide an improved sealing arrangement for hydraulic actuators and the like wherein the sealing ring is disposed between a pair of guide rings and the sealing assembly gives long trouble free service.

It is a further object of this invention to provide a sealing arrangement for hydraulic actuators and the like wherein a pair of guide rings disposed in a recess in one of the relatively extensible and contractable members of the actuator are axially spaced by a metallic spacing ring to provide an axial gap between the guide rings slightly greater than the axial width of the sealing ring disposed of between.

It is a further object of this invention to provide a sealing arrangement as hereinbefore outlined wherein an O-ring is disposed between the sealing ring and spacer ring to effect a fluid tight seal therebetween and to urge the sealing ring radially outward against a cooperating cylindrical surface.

Figure 1:
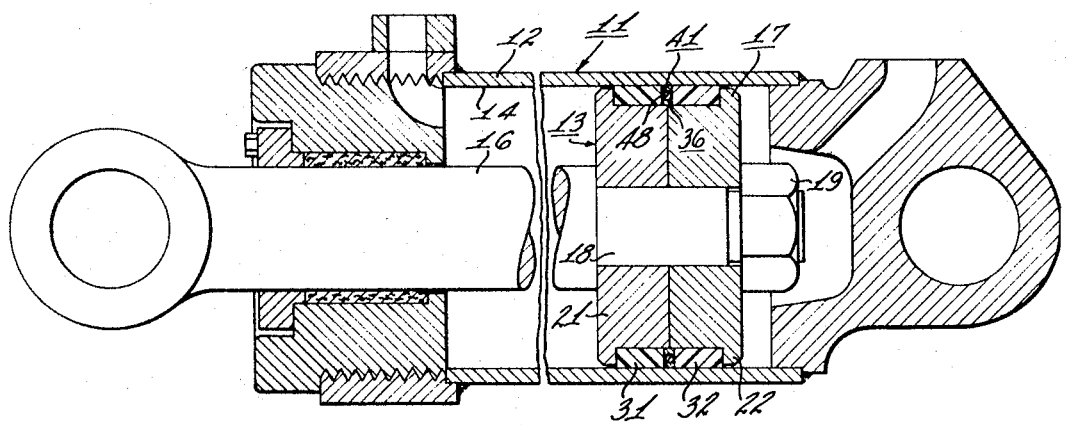
Figure 2:
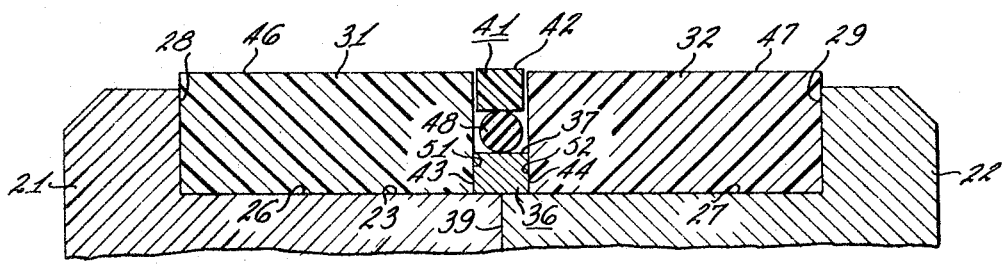

These and other objects and advantages of this invention will be apparent to those familiar with the art when the following description is read in conjunction with the drawings in which:

FIG. 1 is the section view of a hydraulic actuator in which the present invention is incorporated, and FIG. 2 is an enlarged section view of the sealing and guiding arrangement, shown in FIG. 1.

Referring to the drawings, the present invention is shown incorporated in a hydraulic actuator 11 which is comprised of a pair of relatively extensible and contractable components in the form of a cylinder 12 and piston 13. The cylinder 12 presents the radially inwardly facing cylindrical sealing surface 14 against which the piston makes load bearing and sealing contact. The piston 13 includes piston rod 16, a piston head assembly 17 which is secured from a reduced diameter portion 18 of rod 16 and a fastening means in the form of a nut 19. The piston head assembly 17 is made up of a pair of identical piston halves 21, 22. Each of the pistons is machined to provide a stepped outer diameter so that when installed on the rod 16 form a recess 23 which is approximately three-fourths the combined axial width of the two piston halves 21, 22. The recess 23 formed by the piston halves is relatively deep so as to permit use of guide rings 31, 32 having a relatively great radial thickness. As illustrated, cylindrical surfaces 26, 27 and radially extending flat surfaces 28, 29 are formed on the walls of the piston halves 21, 22 to form the desired recess 23. The guide rings 31, 32 are identical and present circumferentially continuous cylindrical surfaces 46, 47 in radial thrust transmitting relation to cylinder surface 14. A rigid metallic spacer ring 36 maintains the desired axial spacing between the guide rings 31, 32 and serves to cover the line of juncture 39 between the piston halves.

A rectangular section sealing ring 41 of nonmetallic elastic material such as Teflon or other commercially available synthetics, is installed between the identical guide rings 31, 32 and presents a circumferential sealing surface 42 in sealing engagement with the cylindrical surface 14 on the cylinder 12. The sealing ring 41 is axially dimensioned to have an axial width slightly less than the axial width of the gap between the guide rings 31, 32. This is conveniently achieved by making the spacer ring 36 of slightly greater axial width than the sealing ring. This allows a slight axial movement of the sealing ring when the piston head is assembled, in which condition the flat end walls 43, 44 are in thrust transmitting relation to the end surfaces 51, 52. The guide rings 31, 32 are designed to carry substantial side thrust loads on their equal diameter cylindrical faces 46, 47, which are in radially confronting relation to the cylindrical surface 14 of the cylinder. An O-ring 48 made of a suitable rubber like material is installed radially between sealing ring 41 and spacer ring 36 and axially between the guide rings 31, 32. When the closed end of the cylinder is pressurized and the rod end is connected with a low pressure part of the hydraulic system, the sealing ring 41 will move slightly toward the rod end of the cylinder to permit pressure fluid to enter the space at the side of the sealing ring 41 facing the direction of the closed end of the cylinder. The O-ring 48 is deformed to establish a fluid seal between the sealing ring 41 and the spacer ring 36 and at the same time urge the sealing ring 41 radially outwardly. When the rod end of the cylinder is pressurized, the sealing ring 41 moves slightly toward the closed end of the cylinder to allow fluid pressure to act on the left side of the O-ring.

In actual practice the guide and seal arrangement illustrated in the drawings and disclosed herein has been found to be extremely effective. The components have been found to be structurally strong and reliable, giving trouble free service. The O-ring slides on the smooth cylindrical surface 37 rather than across the joint between the piston halves. The seal established between the piston and the cylinder has been extremely efficient with leakage held to a minimum.

The embodiments of the invention in which an exclusive property or privilege is claimed are defined as follows:

1. Means for guiding and sealing a pair of relatively extensible and contractable components comprising:
   a smooth cylindrical surface formed on one of said components,
   walls defining an annular recess in the other of said components,
   a pair of axially spaced guide rings in said recess having coaxial cylindrical circumferential faces of substantially equal diameters in confronting relation to said cylindrical surface and flat axially spaced and confronting end surfaces,
   a rigid spacer ring having flat end walls in axial thrust transmitting relation to said end surfaces, respectively,
   a sealing ring of nonmetallic elastic material axially between said guide rings having a circumferential cylindrical sealing face in sealing engagement with said cylindrical surface, the axial width of said sealing ring being less than axial distance between said end surfaces, and an O-ring of rubber like material axially between said end surfaces and radially between said sealing and spacer rings.

2. The structure of claim 1 wherein said other component is a piston having a piston head including a pair of identical piston halves which include said walls defining said recess.

3. The structure of claim 2 wherein said spacer ring covers the juncture between said piston halves.

References Cited

UNITED STATES PATENTS 2,991,003   7/1961   Petersen _____ 92—252

OTHER REFERENCES

German allowed application 1,026,142, March, 1958.

CARROLL B. DORITY, JR., Primary Examiner